United States Patent [19]
Ohkumo

[11] Patent Number: 4,764,156
[45] Date of Patent: Aug. 16, 1988

[54] SYSTEM FOR CONTROLLING TRANSMISSION RATIO OF A CONTINUOUSLY VARIABLE TRANSMISSION FOR A MOTOR VEHICLE

[75] Inventor: Hiroya Ohkumo, Koganei, Japan

[73] Assignee: Fuji Jukogyo Kabushiki Kaisha, Tokyo, Japan

[21] Appl. No.: 944,244

[22] Filed: Dec. 19, 1986

[30] Foreign Application Priority Data
Dec. 19, 1985 [JP] Japan .................................. 60-286625

[51] Int. Cl.$^4$ ........................................... F16H 11/02
[52] U.S. Cl. ........................................ 474/28; 74/856; 74/866
[58] Field of Search ...................... 474/11, 28, 70, 12, 474/16; 74/856, 861, 866-868

[56] References Cited
U.S. PATENT DOCUMENTS

| | | | |
|---|---|---|---|
| 4,547,178 | 10/1985 | Hayakawa et al. | 474/28 X |
| 4,601,680 | 7/1986 | Tokoro et al. | 474/11 |
| 4,631,043 | 12/1986 | Tokoro et al. | 474/28 X |
| 4,660,440 | 4/1987 | Matsumura et al. | 74/866 |

Primary Examiner—Stephen J. Novosad
Assistant Examiner—Thuy M. Bui
Attorney, Agent, or Firm—Martin A. Farber

[57] ABSTRACT

A control system for a motor vehicle provided with a continuously variable transmission. The transmission has a drive pulley, a driven pulley, a transmission ratio control valve having ports and a spool, and a hydraulic circuit for supplying oil to the transmission ratio control valve so as to control the transmission ratio. When a speed sensor of one of the pulleys fails to properly sense the speed of the pulley, the transmission ratio control valve is operated by fail-safe operation so as to maintain the ratio transmission to a proper value.

17 Claims, 7 Drawing Sheets

SYSTEM FOR CONTROLLING TRANSMISSION RATIO OF A CONTINUOUSLY VARIABLE TRANSMISSION FOR A MOTOR VEHICLE

BACKGROUND OF THE INVENTION

The present invention relates to a control system for a continuously variable belt-drive automatic transmission for a motor vehicle, and more particularly to a fail-safe system for a failure of sensors such as speed sensors of a pulley of the transmission.

A known continuously variable belt-drive transmission (hereinafter called CVT) for a motor vehicle comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to servo devices, a line pressure control valve and a transmission ratio control valve. Each valve comprises a spool to control the oil supplied to the servo devices. The transmission ratio control valve operates to determine the transmission ratio in accordance with the opening degree of a throttle valve of an engine and the speed of the engine.

In a control system described in EP-A No 0182616, a drive pulley speed (engine speed) sensor, a driven pulley speed sensor, and a throttle position sensor are provided. Actual transmission ratio (i) is calculated by a calculator based on the output signals ($N_P$) of the drive pulley speed sensor and the output signal ($N_S$) of the driven pulley speed sensor with a formula ($i = N_P/N_S$). Desired transmission ratio (id) is calculated based on the output signal ($N_S$) of the driven pulley speed sensor and the output signal ($\theta$) of the throttle position sensor. The actual transmission ratio i is controlled to the desired transmission ratio id by shifting the spool of the transmission ratio control valve.

When failure occurs in the sensing system, such as failure of one of the sensors, or disconnection of a connector of a sensor, the transmission ratio can not be controlled. For example, if the connector of the drive pulley speed sensor disengages from a socket, the output signal $N_P$ of the sensor becomes zero. Accordingly, the output ($i = N_P/N_S$) of the calculator becomes a minimum value i min. In most cases, the desired transmission ratio id is larger than the minimum value i min. Therefore, the transmission is downshifted so that the actual ratio becomes the desired ratio id. As a result, the transmission ratio i becomes a maximum value i max. If the transmission is rapidly downshifted during the driving of the vehicle, the engine speed quickly increases to an excessive speed, which causes a breakdown of the engine in case of a high vehicle speed.

When the output signal $N_S$ of the driven pulley speed sensor becomes zero, the output ($i = N_P/N_S$) of the calculator becomes a maximum value i max. Accordingly, the transmission is upshifted so as to provided the desired value. As a result, the transmission ratio reaches a minimum value i min. The minimum value is kept during the driving. Namely, the vehicle is driven by very small torque, which will cause a reduction in the driveability of the vehicle.

SUMMARY OF THE INVENTION

The object of the present invention is to provide a fail-safe system which may avoid the above described troubles upon failure of the pulley speed sensors.

According to the present invention the system has a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a hydraulic circuit having a pump for supplying oil to the first cylinder through the transmission ratio control valve, and first means for shifting the spool of the transmission ratio control valve in dependence on operating conditions of the engine so as to provide a transmission ratio.

The system further comprises a drive pulley speed sensor for producing a drive pulley speed signal dependent on the speed of the drive pulley, a driven pulley speed sensor for producing a driven pulley speed signal depndent on the speed of the driven pulley, first abnormality detecting means for producing a first abnormality signal when the drive pulley speed signal represents an abnormal value, second abnormality detecting means for producing a second abnormality signal when the driven pulley speed signal represents an abnormal value, second means responsive to the first abnormality signal for producing a fail-safe transmission ratio signal, said first means being responsive to the fail-safe transmission ratio signal for shifting the spool of the transmission ratio control valve in dependency on said fail-safe transmission ratio signal for controlling the transmission ratio dependent on the fail-safe transmission ratio signal, third means responsive to the second abnormality signal for producing a fail-safe signal, and said first means being responsive to said fail-safe signal for shifting the spool of the transmission ratio control valve in dependency on said fail-safe signal for controlling the transmission ratio dependent on said fail-safe signal.

The other objects and features of this invention will become understood from the following description with reference to the accompanying drawings.

DETAILED DESCRIPTION OF THE PREFERRED EMBODIMENT

Figure 1:
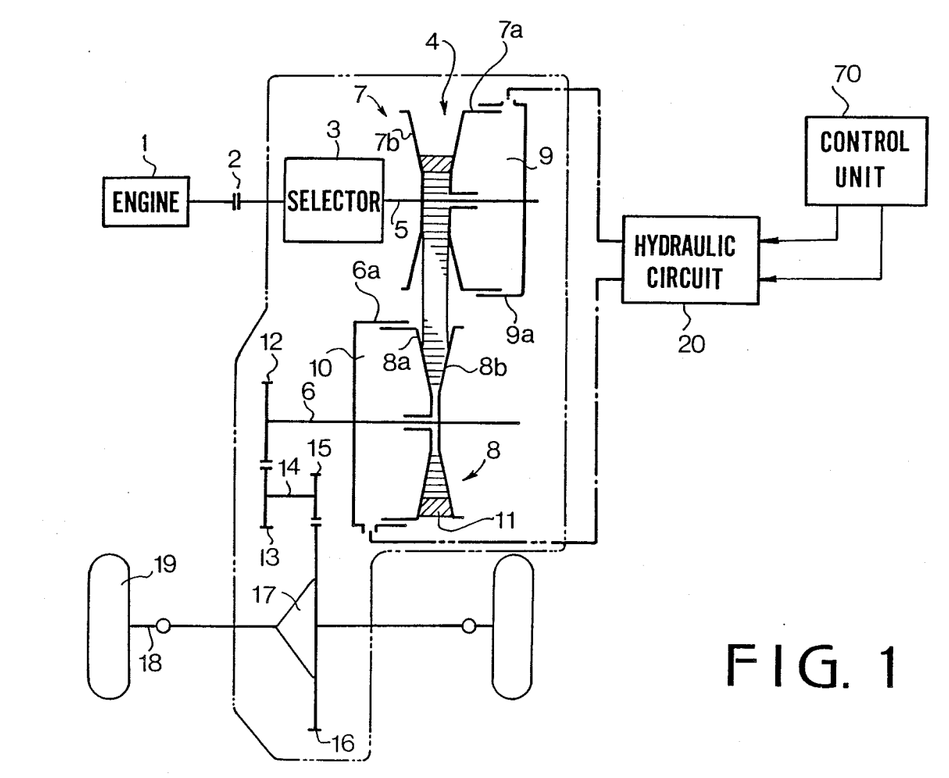
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
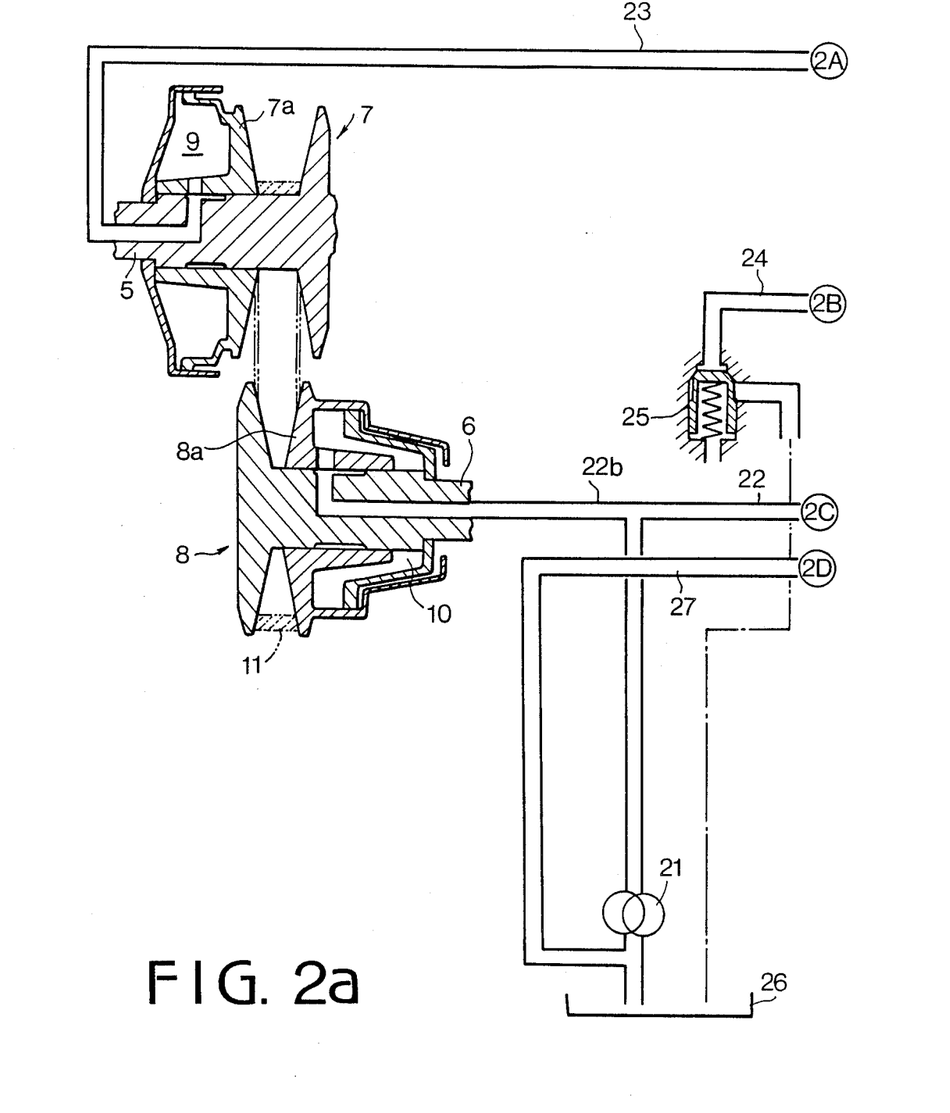
FIGS. 2a and 2b are schematic diagrams showing a control system according to the present invention.
Figure 2B:
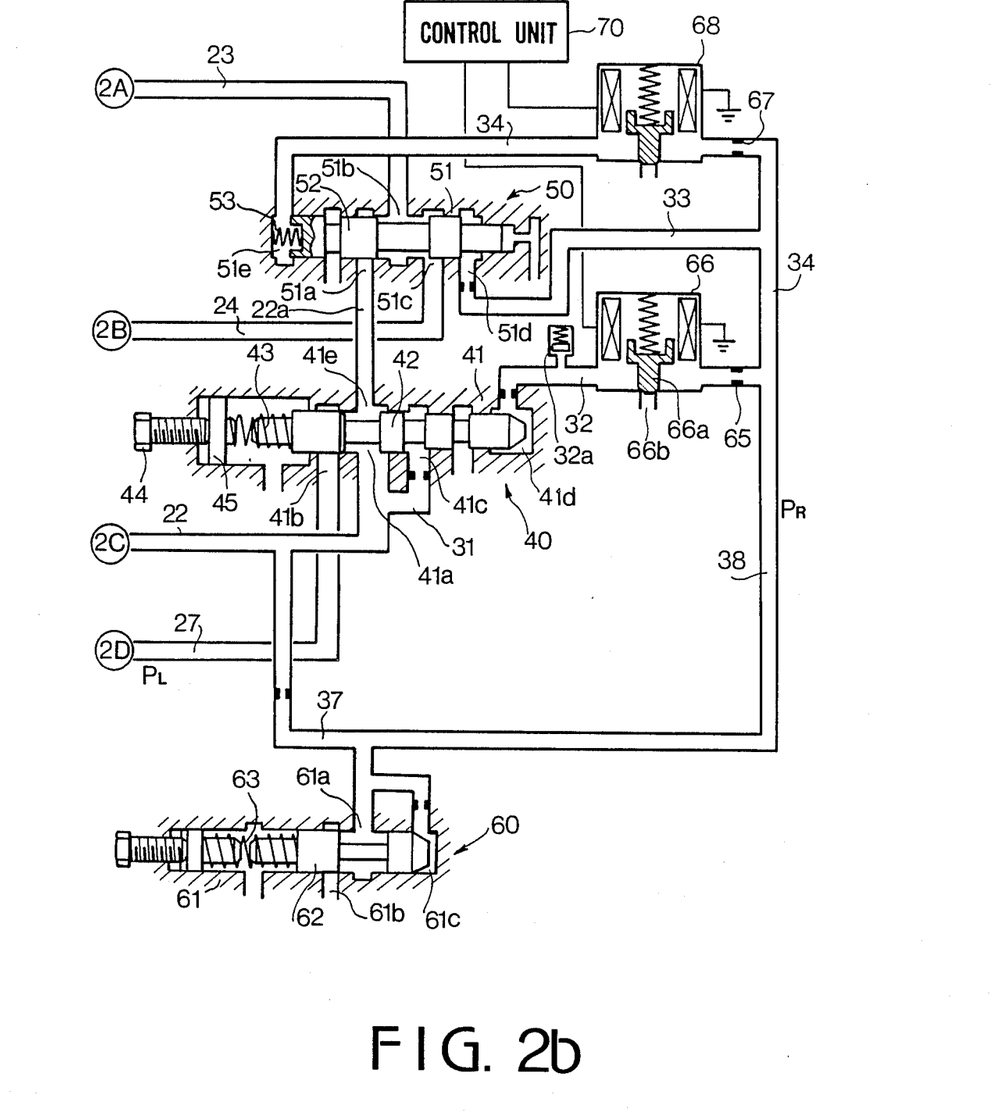

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and a conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool 52. The port 51b communicates with the chamber 9 through conduit 23, and the port 51a communicates with port 41e of the line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to the chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d when the duty ratio is 0%, and zero by controlling the duty ratio of the pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber 51e. Further, the speed of the movement of the spool 52 changes with the magnitude of changing duty ratio. The spool 52 is shifted to an oil drain position by decreasing the duty ratio. It will be understood that when the oil is supplied to the chamber 9, the transmission is upshifted.

Figure 3:
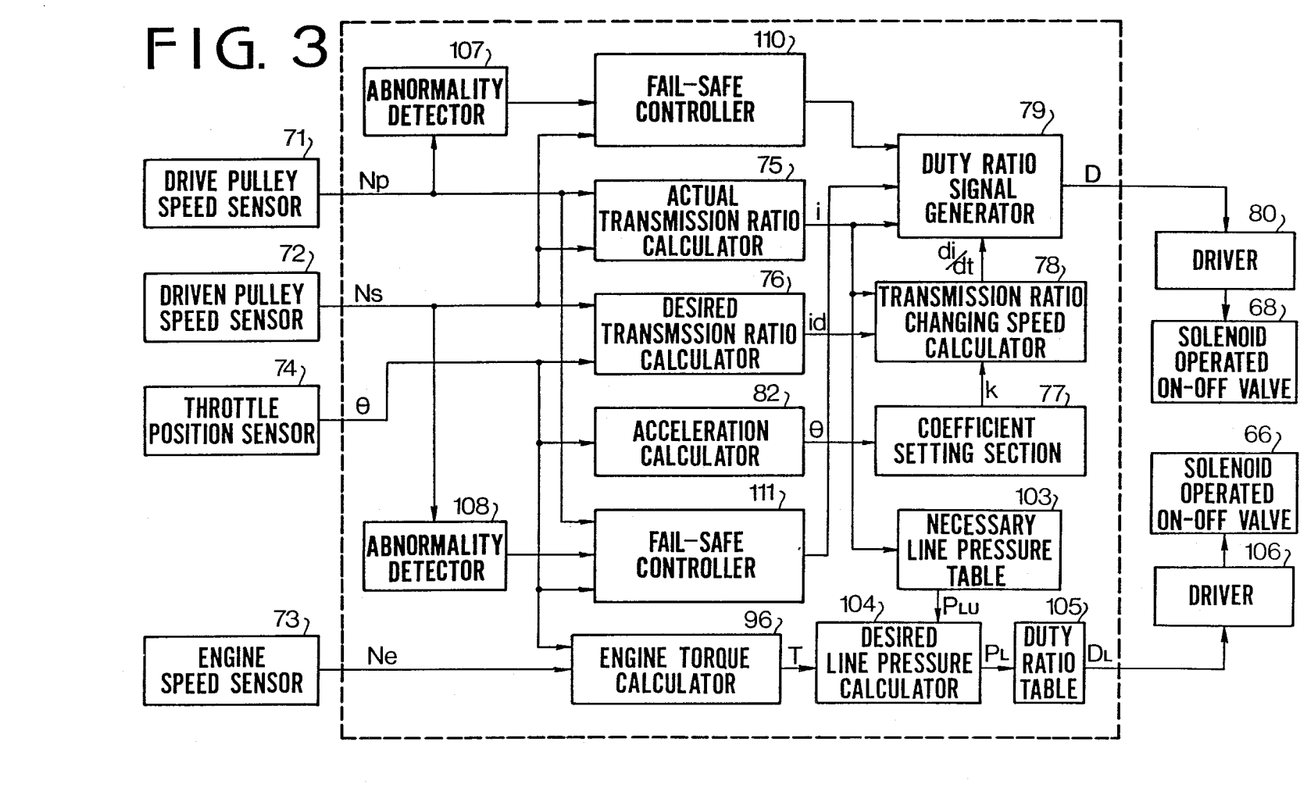
FIG. 3 is a block diagrams showing a control unit.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of sensors 71, 72 are fed to an actual transmission ratio calculator 75 to produce an actual transmission ratio i in accordance with $i = N_p/N_s$. Output signal $N_s$ and output signal $\theta$ of the throttle position sensor 74 are fed to a desired transmission ratio calculator 76. The desired transmission ratio id is calculated by the calculator 76 in accordance with the signals $N_s$ and $\theta$. On the other hand, the output signal $\theta$ is fed to an acceleration calculator 82 to obtain a signal representing the acceleration $\dot{\theta}$. The signal of the acceleration $\dot{\theta}$ is supplied to a coefficient setting section 77 to produce a coefficient K. The actual transmission ratio i, desired transmission ratio id and coefficient K from the coefficient setting section 77 are applied to a transmission ratio changing speed calculator 78 to produce a transmission ratio changing speed $di/dt$ from the formula $di/dt = K(id - i)$.

The speed $di/dt$ and actual ratio i are applied to a duty ratio signal generator 79 to generate the duty ratio D. The duty ratio D is supplied to the solenoid operated valve 68 through a driver 80.

Further, the output signal $\theta$ of throttle position sensor 74 and the output $N_e$ of engine speed sensor 73 are fed to an engine torque calculator 96, so that engine torque T is calculated based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In the system of the present invention, the signals $N_P$ and $N_S$ of pulley speed sensors 71 and 72 are supplied to abnormality detectors 107 and 108 so as to detect failures of the drive and driven pulley speed sensor systems. Each of the detectors 107 and 108 produces an abnormality signal, when the output of each sensor is zero. The abnormality signal of the detector 107 is applied to a first fail-safe controller 110, and the abnormality signal of the detector 108 is fed to a second fail-safe controller 111. Output signals of the fail-safe controllers 110 and 111 are applied to the duty ratio signal generator 79.

In operation, while the vehicle is at a stop, chamber 10 of the driven pulley 8 is supplied with line pressure through passage 22b, and the chamber 9 of the drive pulley 7 is drained, since the $N_P$, $N_s$, $\theta$ and the duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started.

At that time the line pressure is at the highest value by the pressure control valve 40, since the duty ratio for the valve 66 is large, and the spool 42 of the control valve 40 is at the right end position. When the throttle valve is opened for acceleration, the desired transmission ratio id and the transmission ratio changing speed di/dt are calculated by calculators 76, 78, and the duty ratio D is obtained from the duty ratio signal generator 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, the duty ratio for the valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50. When the vehicle speed (output signal $N_s$) exceeds a predetermined value, the clutch 2 is entirely engaged.

The control operation of line pressure will be described hereinafter with reference to FIGS. 2a, 2b, 3. From the engine torque calculator 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

In the fail-safe system, the transmission ratio control at the failure of the drive pulley sensor system is performed in an open loop control system in dependency on the output signal $N_S$ of the driven pulley speed sensor 72, and the control at the failure of the driven pulley sensor system is performed in a closed loop control system in dependency on the output signal $N_P$ of the drive pulley speed sensor 71.

The fail-safe operation is described with reference to FIGS. 6 and 7. At steps $S_1$, $S_2$ and $S_3$ in FIG. 6, output signals $\theta$, $N_P$, $N_S$ are read out. When the output signal $N_P=0$ at a step $S_4$, an abnormality flag is set at a step $S_{13}$. When $N_P$ is not zero, the abnormality flat (if it was set at a previous program) is reset at a step $S_5$. At a step $S_6$, when the output signal $N_S$ is not zero, the above described control operation is performed at steps $S_7$ to $S_{10}$.

Figure 4:
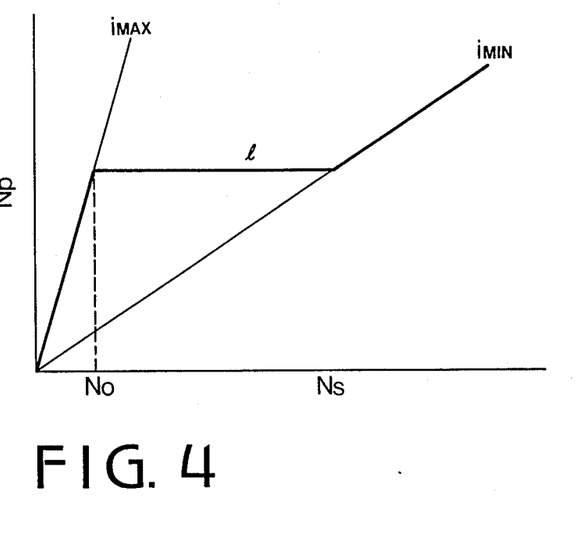
FIGS. 4 and 5 are graphs showing transmission characteristics in fail-safe operations.
Figure 7:
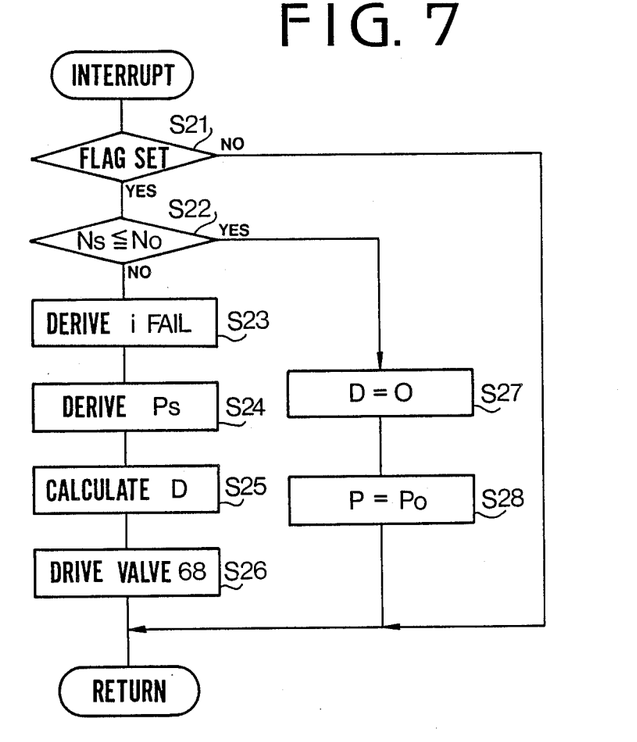

The fail-safe operation, when the abnormality flag at the step $S_{13}$ is set, is performed by an interrupt routine shown in FIG. 7. The interrupt routine is executed at intervals of a predetermined time. When the flag is set (step $S_{21}$) and when the output signal $N_S$ of the driven pulley speed sensor is not larger than a predetermined low value $N_0$ at a step $S_{22}$, the duty ratio is set to zero at a step $S_{27}$. Therefore, primary pressure P in the chamber 9 of the drive pulley 7 becomes a minimum value $P_0$ at a step $S_{28}$. Thus, the transmission ratio is at maximum value i max as shown in FIG. 4.

When $N_S$ is larger than $N_0$, a desired (fail-safe) transmission ratio iFAIL for the fail-safe operation is derived from a look-up table in accordance with the output signal $N_S$ or signals $N_S$ and $\theta$ at a step $S_{23}$. At a step $S_{24}$, a desired primary pressure $P_S$ for the chamber 9 is obtained from a look-up table in accordance with the desired transmission ratio iFAIL. Further, at a step $S_{25}$, a duty ratio D for the pressure $P_S$ is calculated. The relationship between the duty ratio D and the pressure $P_S$ after a short time $\Delta t$ is as follows.

$$P_S = P_0 + \Delta P$$
$$= P_0 + \frac{1}{\beta} \frac{Q\Delta t}{V}$$
$$= P_0 + \frac{1}{\beta} \frac{\Delta t}{V} \cdot a \cdot \{D \cdot SI \sqrt{P_L - P_0} -$$
$$(1 - D)SD \sqrt{P_0}\}$$

where
  $\beta$ is the compression rate of oil,
  Q is the oil flow rate for the chamber 9,
  V is the capacity of the chamber 9,
  a is a coefficient decided by the oil,
  $P_L$ is the line pressure,
  SI is the sectional area of the inlet port of the transmission ratio control valve 50,
  SD is the sectional area of the drain port of the transmission ratio control valve 50.

Thus, by operating the valve 68 at the calculated duty ratio D, the pressure P becomes $P_S$ (step $S_{26}$), so that the transmission ratio is controlled to the ratio iFAIL. Line 1 of FIG. 4 shows a variation of the transmission ratio by the fail-safe operation.

Figure 5:
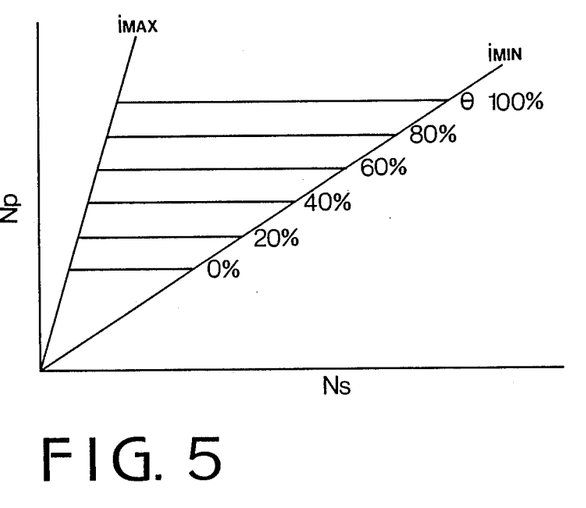
Figure 6:
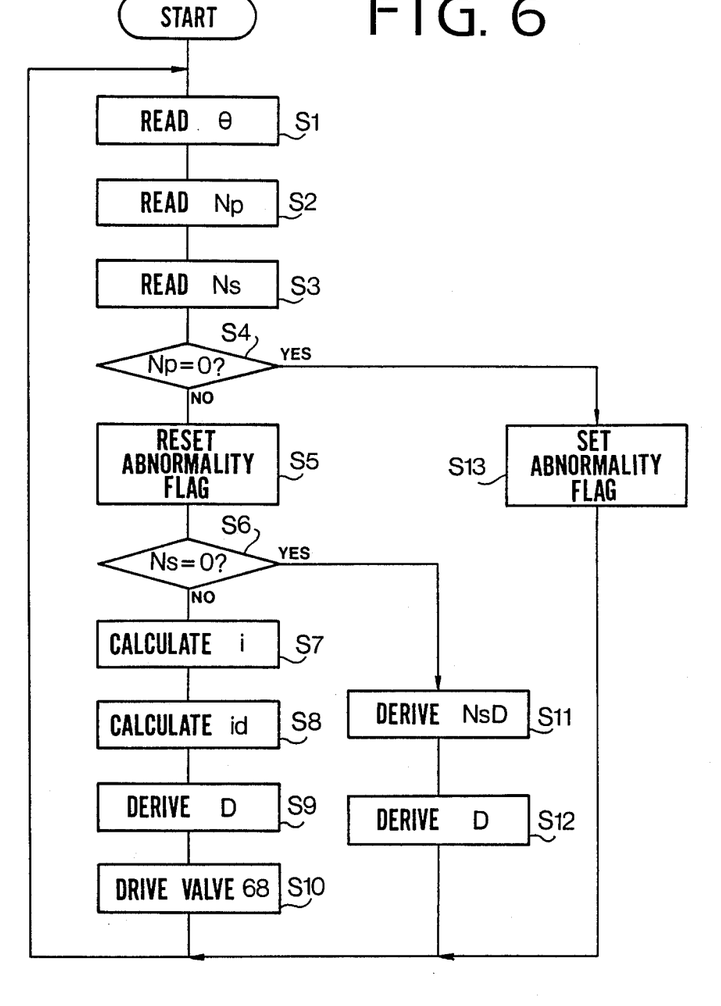
FIGS. 6 and 7 are flowcharts showing the operation of the control system.

When the output signal $N_S$ is zero at step $S_6$ of FIG. 6, a desired (fail-safe) driven pulley speed $N_SD$ is derived from a look-up table in accordance with the output signal $\theta$ of the throttle position sensor 74 at a step $S_{11}$. At a step $S_{12}$, a duty ratio D is derived from a look-up table in accordance with the signals $N_P$ and $N_SD$. The transmission ratio is controlled by the derived duty ratio D, so that the actual driven pulley speed can converge to the desired speed $N_SD$ by feedback control. FIG. 5 shows variations of transmission ratios at various opening degrees of the throttle valve.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, a transmission ratio control valve having ports and a spool, a hydraulic circuit having a pump for supplying oil to the first hydraulic cylinder through the transmission ratio control valve, the system comprising:
   first means for shifting the spool of the transmission ratio control valve in dependency on operating conditions of the engine so as to provide a transmission ratio;
   a drive pulley speed sensor for producing a drive pulley speed signal dependent on the speed of the drive pulley;
   a driven pulley speed sensor for producing a driven pulley speed signal dependent on the speed of the driven pulley;
   first abnormality detecting means for producing a first abnormality signal when the drive pulley speed signal represents an abnormal value compared with the value of the drive pulley speed signal;
   second abnormality detecting means for producing a second abnormality signal when the driven pulley speed signal represents an abnormal value compared with the value of the drive pulley speed signal;
   second means responsive to the first abnormality signal for producing a fail-safe transmission ratio signal;
   said first means being responsive to the fail-safe transmission ratio signal for controlling the transmission ratio dependent on the fail-safe transmission ratio signal;
   third means responsive to the second abnormality signal for producing a fail-safe signal;
   said first means being responsive to the fail-safe signal for controlling the transmission ratio dependent on the fail-safe signal.

2. The system according to claim 1, wherein the first means comprises another hydraulic circuit for applying oil to the transmission ratio control valve so as to shift the spool and a control valve for controlling the oil applied to the transmission ratio control valve.

3. In a control system for a continuously variable transmission having a continuously variable transmission ratio for transmitting power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a transmission ratio control valve having ports and a shiftable spool, and a first hydraulic circuit having a pump for supplying oil to the first hydraulic cylinder via the transmission ratio control valve and to the second hydraulic cylinder, the improvement in the system comprising:
   first means for shifting the spool of the transmission ratio control valve in dependency on operating conditions of the engine so as to provide a transmission ratio;
   a drive pulley speed sensor for producing a drive pulley speed signal dependent on the speed of the drive pulley;
   a driven pulley speed sensor for producing a driven pulley speed signal dependent on the speed of the driven pulley;
   first abnormality detecting means for producing a first abnormality signal when the drive pulley speed signal has an abnormal value;
   second abnormality detecting means for producing a second abnormality signal when the driven pulley speed signal has an abnormal value;
   second means responsive to the first abnormality signal for producing a fail-safe transmission ratio signal;
   said first means being responsive to the fail-safe transmission ratio signal for shifting the spool of the transmission ratio control valve in dependency on said fail-safe transmission ratio signal for controlling the transmission ratio dependent on the fail-safe transmission ratio signal;
   third means responsive to the second abnormality signal for producing another fail-safe signal;
   said first means being responsive to the fail-safe signal for shifting the spool of the transmission ratio control valve in dependency on said fail-safe signal for controlling the transmission ratio dependent on said fail-safe signal.

4. A control system according to claim 3, wherein said first and second abnormality detecting means produce said first and second abnormality signals when said abnormal values are zero, respectively.

5. A control system according to claim 3, wherein said second means produces said fail-safe transmission ratio signal as a function of said driven pulley speed signal upon occurrence of said first abnormality signal.

6. A control system according to claim 5, wherein said second means produces said fail-safe transmission ratio signal as a function of said driven pulley speed signal upon occurrence of said first abnormality signal such that as said driven pulley speed signal increases said fail-safe transmission ratio signal is representative of a decreasing transmission ratio.

7. A control system according to claim 3, wherein said second means produces said fail-safe transmission ratio signal as a function of said driven pulley speed signal and position of a throttle valve of the engine upon occurrence of said first abnormality signal.

8. A control system according to claim 3, wherein said second means produces said fail-safe transmission ratio signal as representative of a maximum transmission ratio upon occurrence of said first abnormality signal when said driven pulley speed is at least as high as a predetermined low value, and said second means produces said fail-safe transmission ratio signal as a changing function of said driven pulley speed signal upon occurrence of said first abnormality signal when said driven pulley speed is higher than said predetermined low value.

9. A control system according to claim 8, wherein said changing function is also dependent on position of a throttle valve of the engine.

10. A control system according to claim 8, wherein said changing function is such that, said fail-safe transmission ratio signal as said changing function multiplied by said driven pulley speed signal is substantially constant.

11. A control system according to claim 3, wherein said second means produces said fail-safe transmission ratio signal as representative of a minimum transmission ratio upon occurrence of said first abnormality signal when said driven pulley speed is higher than a predetermined high value.

12. A control system according to claim 3, wherein said third means produces said fail-safe signal as a function of said drive pulley speed and position of a throttle valve of the engine upon occurrence of said second abnormality signal.

13. A control system according to claim 3, wherein said third means produces said fail-safe signal as a function of position of a throttle valve of the engine upon occurrence of said second abnormality signal.

14. A control system according to claim 3, wherein said fail-safe signal is representative of the transmission ratio as a function of opening degree of the throttle valve such that as the opening degree increases said fail-safe signal is representative of an increasing transmission ratio.

15. A control system according to claim 14, wherein said fail-safe signal is representative of the transmission ratio also as a function of drive pulley speed such that, driven pulley speed multiplied by the transmission ratio represented by said fail-safe signal is substantially a constant, said constant being different depending on the opening degree of the throttle valve.

16. A control system according to claim 15, wherein said constant increases as the opening degree of the throttle valve increases.

17. In a control system for a continuously variable transmission having a continuously variable transmission ratio for transmitting power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a transmission ratio control valve having ports and a shiftable spool, and a first hydraulic circuit having a pump for supplying oil to the first hydraulic cylinder via the transmission ratio control valve and to the second hydraulic cylinder, the improvement in the system comprising:

first means for shifting the spool of the transmission ratio control valve in dependency on operating conditions of the engine so as to provide a transmission ratio;

a pulley speed sensor for producing a pulley speed signal dependent on the speed of one of the pulleys;

abnormality detecting means for producing an abnormality signal when the pulley speed signal has an abnormal value;

second means responsive to the abnormality signal for producing a fail-safe transmission ratio signal;

said first means being responsive to the fail-safe transmission ratio signal for shifting the spool of the transmission ratio control valve in dependency on said fail-safe transmission ratio signal for controlling the transmission ratio dependent on the fail-safe transmission ratio signal.

* * * * *